(12) United States Patent
Freund et al.

(10) Patent No.: US 12,549,572 B2
(45) Date of Patent: Feb. 10, 2026

(54) BYZANTINE SITUATION-AWARE DEFENSIVE SYSTEM FOR ZERO TRUST ARCHITECTURES

(71) Applicant: Dell Products L.P., Round Rock, TX (US)

(72) Inventors: Werner Spolidoro Freund, Rio de Janeiro (BR); Joubert de Castro Lima, Cataguases (BR); Roberto Nery Stelling Neto, Rio de Janeiro (BR); Vinicius Facco Rodrigues, São Paulo (BR); Victor da Cruz Ferreira, Rio de Janeiro (BR); Vicente J.P. Amorim, João Monlevade (BR)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 18/639,867

(22) Filed: Apr. 18, 2024

(65) Prior Publication Data

US 2025/0373623 A1 Dec. 4, 2025

(51) Int. Cl.
*H04L 9/40* (2022.01)
(52) U.S. Cl.
CPC .......... *H04L 63/1416* (2013.01); *H04L 63/20* (2013.01)
(58) Field of Classification Search
CPC ............................ H04L 63/1416; H04L 63/20
USPC .......................................................... 726/23
See application file for complete search history.

(56) References Cited

U.S. PATENT DOCUMENTS

| 8,955,111 B2* | 2/2015 | Glew | G06F 21/552 |
| | | | 726/25 |
| 9,460,290 B2* | 10/2016 | Glew | G06F 21/577 |
| 2003/0149888 A1* | 8/2003 | Yadav | H04L 63/1408 |
| | | | 726/23 |
| 2005/0154733 A1* | 7/2005 | Meltzer | H04L 63/1416 |
| 2015/0033305 A1* | 1/2015 | Shear | G06F 21/6245 |
| | | | 726/11 |

(Continued)

OTHER PUBLICATIONS

Rose, Scott, Oliver Borchert, Stu Mitchell, and Sean Connelly. Zero trust architecture. No. NIST Special Publication (SP) 800-207. National Institute of Standards and Technology, 2020.

(Continued)

*Primary Examiner* — Teshome Hailu
(74) *Attorney, Agent, or Firm* — Workman Nydegger

(57) ABSTRACT

One example method includes receiving, from a component participating in byzantine decision-making processes, one or more echo messages, and the echo messages originate either from communications sent by the component to one or more other components participating in the byzantine decision-making processes, or from communications received by the component from the one or more other components participating in the byzantine decision-making processes; logging the echo messages in a database; forwarding the echo messages to a byzantine situation awareness service (BSAS); scanning, by the BSAS, the echo messages; identifying, by the BSAS, a discrepancy in the echo messages; communicating, by the BSAS, the discrepancy to an incident management system; and implementing, or directing implementation of, by the incident management system, a remedial action that corresponds to the discrepancy.

16 Claims, 5 Drawing Sheets

(56) References Cited

U.S. PATENT DOCUMENTS

2019/0109877 A1* 4/2019 Samuel .................. H04W 4/70

OTHER PUBLICATIONS

DISA and NSA, 2022. Department of Defense Zero Trust Reference Architecture, Version 2.0.

L. Ferretti, F. Magnanini, M. Andreolini, and M. Colajanni, "Survivable zero trust for cloud computing environments," Computers & Security, vol. 110, p. 102419, Nov. 2021, doi: 10.1016/j.cose.2021.102419.

Castro, Miguel, and Barbara Liskov. "Practical byzantine fault tolerance." OsDI.vol. 99. No. 1999. 1999.

G. Bracha and S. Toueg, "Asynchronous consensus and broadcast protocols," J. ACM, vol. 32, No. 4, pp. 824-840, Oct. 1985, doi: 10.1145/4221.214134.

* cited by examiner

FIG. 1  *REPRESENTATIVE SYSTEMS, SERVICES, AND CAPABILITIES FOR EACH PILLAR*

BYZANTINE SITUATION-AWARE DEFENSIVE SYSTEM FOR ZERO TRUST ARCHITECTURES

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to zero trust architectures (ZTA). More particularly, at least some embodiments relate to systems, hardware, software, computer-readable media, and methods, for implementing a situational awareness capability in a ZTA and its constituent elements.

BACKGROUND

The DoD Reference Architecture (ZTRA) defines several postures to increase network cybersecurity inspired by Zero Trust (ZT) tenets and principles. Activities are only authorized in the network by Policy Enforcement Points (PEPs) as the result of the evaluations performed in Policy Decision Points (PDPs). As identified by NIST, a major internal threat to ZTAs is the subversion of the decision or enforcement processes that take place in the ZTA. Byzantine Fault Tolerance (BFT) technology adds resiliency to faults and attacks, and may thus help to provide a promising path to harden ZTAs against such threat.

However, straightforward usage of BFT technology within a ZTA disregards additional is an incomplete approach. In particular, the Security Information and Event Management (SIEM) system has the role of logging and analyzing network activities to identify threats, including within PDP and PEP components. Security Orchestration and Automation Response (SOAR) system performs in depth evaluation of potential threats identified by the SIEM and, under confirmation, is responsible for remediating such threats.

While useful in some respects, current ZTAs fail to address a number of different problems. For example, ZTRA fully entrusts control plane components and so does not provide neither resiliency nor situation-awareness to attacks attempting to subvert their decision process. Further, computationally inefficient solutions imply higher ZTA costs and the trade-off with respect to protection gains may not be reasonable for some clients. As another example, the network region having ZTA components lacks a mechanism to understand what is happening, and where, when an attack occurs. This problem is of particular concern in a worst-case scenario in which a control plane has been subverted.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
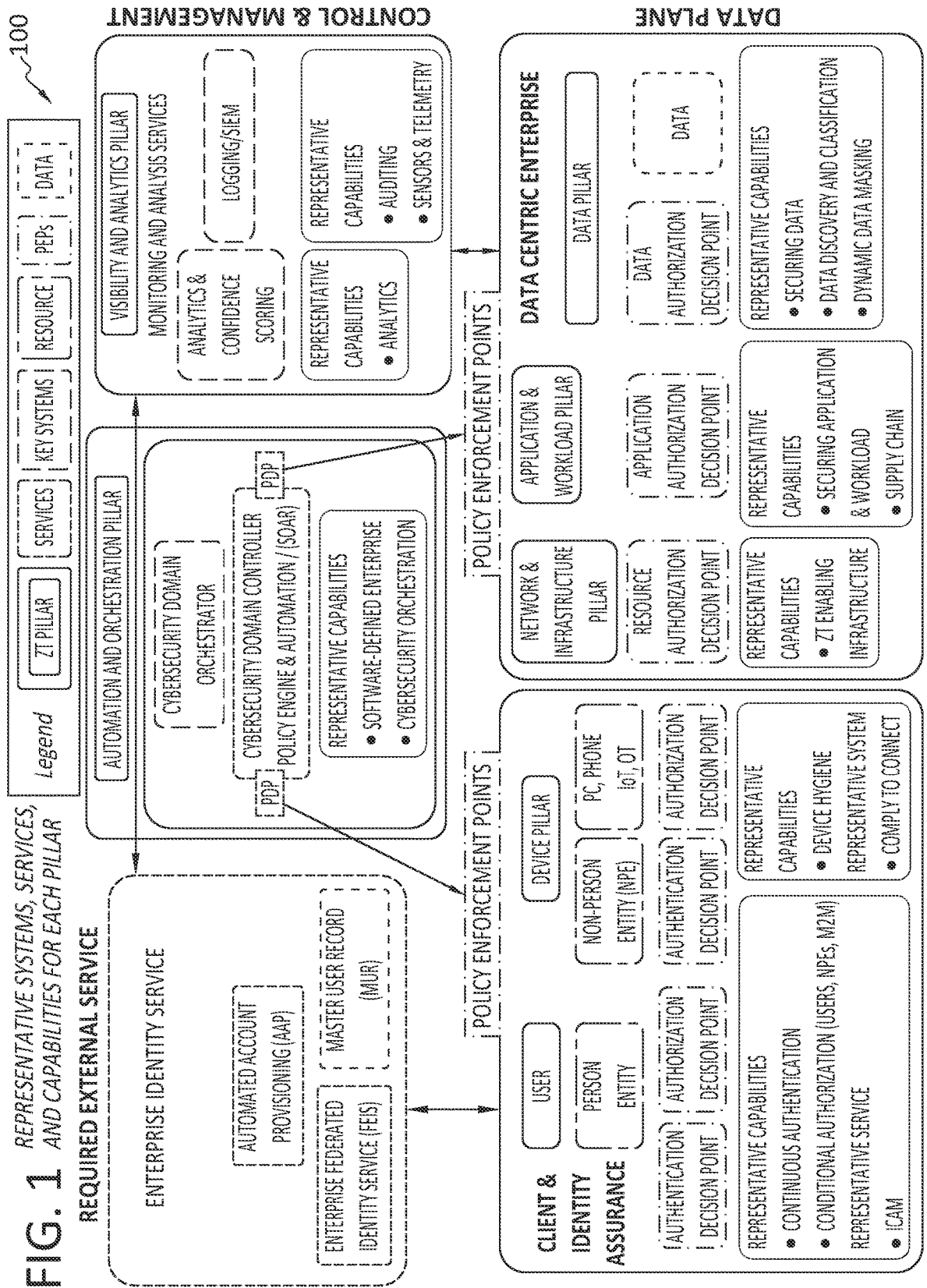
FIG. 1 discloses aspects of an example reference ZTA.

Embodiments disclosed herein generally relate to zero trust architectures (ZTA). More particularly, at least some embodiments relate to systems, hardware, software, computer-readable media, and methods, for implementing a situational awareness capability in a ZTA and its constituent elements.

One method according to an example embodiment is concerned with hardening a ZTA by incorporating, in the ZTA, a situational awareness capability in various elements of the ZTA. One embodiment of such a method may comprise the following operations: in a BFT (Byzantine Fault Tolerant (BFT) environment, generating and collecting echo messages between and among elements of an associated network; using the echo messages to identify a potential discrepancy in the network indicative of an attack or other problem; reporting the potential discrepancy; and, based on the potential discrepancy, taking, or causing, a remedial action to eliminate or attenuate the potential discrepancy.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiments is that nodes in a network operating according to a ZT protocol are able to become aware of a situation in the network that may be indicative of a problem. An embodiment may implement situational awareness, by network nodes, of the status of access control components that are operable to enable access, by the nodes, to network resources. An embodiment may identify and implement remedial actions based on the situational awareness, by network nodes, as to the status of access control components in the network. Various other advantages of one or more example embodiments will be apparent from this disclosure.

A. REFERENCES

The following references may be referred to herein, and are incorporated herein in their respective entireties by this reference. The references may be referred to herein according to their respective number in the following list.

[1] Rose, Scott, Oliver Borchert, Stu Mitchell, and Sean Connelly. *Zero trust architecture. No. NIST Special Publication (SP) 800-207. National Institute of Standards and Technology*, 2020.

[2] DISA and NSA, 2022. *Department of Defense Zero Trust Reference Architecture, Version* 2.0.

[3] L. Ferretti, F. Magnanini, M. Andreolini, and M. Colajanni, "Survivable zero trust for cloud computing environments," Computers & Security, vol. 110, p. 102419, November 2021, doi: 10.1016/j.cose.2021.102419.

[4] Castro, Miguel, and Barbara Liskov. "*Practical byzantine fault tolerance.*" OsDI. Vol. 99. No. 1999. 1999.

[5] G. Bracha and S. Toueg, "*Asynchronous consensus and broadcast protocols,*" J. ACM, vol. 32, no. 4, pp. 824-840, October 1985, doi: 10.1145/4221.214134.

B. ASPECTS OF A CONTEXT AND OPERATING ENVIRONMENT FOR ONE EMBODIMENT

B.1 Interoperability and Consensus

As noted in [3], there currently exist two categories of trust distribution approaches to mitigate the impact of violations to IT (information technology) infrastructure components, namely:

(1) inter-component trust distribution employs control dependency relationships between components—this approach is leveraged by typical cybersecurity systems and is further enhanced by ZT systems, as discussed below, through the definition within its tenets and principles of several interoperability relationships between control components—it is noted however that the effectiveness of current ZTRA resiliency may be limited in that the current ZTRA resiliency is completely based on interoperability, and focuses on reducing implicit trust regions with thin granularity access control so that threat actors make slow progress in the network, therefore hopefully increasing the chances of detecting activities before adversaries can cause damage;

(2) intra-component trust distribution replaces each component with a functionally equivalent structure composed of multiple replicas—the BFT protocols, discussed below, are typically developed in an extreme scenario where consensus must be stablished in a network serving a common interest for multiple stakeholders—that is, the network does not have an owner—it is noted, however, that ZTAs are typically owned by an organization, which may thus enable implementation of an embodiment that includes employment of trust sharing asymmetries in network components to enhance overall system resiliency.

One example embodiment may combine elements of both of categories of trust distribution. This combination may embody a much more resilient solution with respect to either of the original counterparts when considering, for example, the resource usage, and resilience, of an embodiment as compared with resource usage and resilience of the conventional trust distribution approaches.

B.2 Zero Trust Systems

The Zero Trust (ZT) approach to cybersecurity establishes a set of principles and tenets that guides the development of IT infrastructure architectural designs. DoD ZTRA describes how to achieve these desired aspects through interoperability of several components of a ZT reference architecture 100, as depicted in FIG. 1. Details concerning the configuration and operation of the ZT reference architecture 100 can be found in reference [2].

One aspect of ZT systems is constant access verification to resources such as devices, application and data through PEP (policy enforcement point) and PDP (policy decision point) components. Access control is expected to be dynamic based on threat situation-awareness, that is, to update risk tolerance depending on the presence of potentially malicious activities. SIEM (security information and event management) is responsible to collect IT infrastructure telemetry and to perform activity auditing, thus providing situation awareness information to control components. Finally, a SOAR (security orchestration and automation response) component performs automated threat mitigation, therefore patching potentially compromised access control components.

One example embodiment may incorporate tenet #6 of reference [2], which specifies that "All events are to be continuously monitored, collected, stored, and analyzed to assess compliance with security policies," as well as tenet #5 of reference [2], which specifies that "Apply unified analytics for Data, Applications, Assets, Services (DAAS) to include behavioristics, and log each transaction," that is, all transactions must be logged to enable analytics.

Using ZTA interoperability and its visibility principle, an example embodiment comprises a configuration based on BFT protocols that may reduce attack vectors to access control components, and may also provide an efficient situation awareness mechanism, the use of which may provide dynamic access control to network resources, and also provide automated threat mitigation.

B.3 Byzantine Fault Tolerant (BFT) Protocols

BFT technology typically deals with the problem of stablishing consensus in a network of stakeholders, that is, nodes, when communicating asynchronously in the presence of faulty components or malicious actors with a common interest. It has been shown that in a set of n nodes, the constraint of $n \geq 3f+1$ holds, where f is the number of malicious or faulty nodes. It is important to note that all messages exchanged in all pBFT phases are cryptographically signed. This makes the process of impersonating other nodes impractical when strong cryptography is employed. One embodiment may assume that such cryptography is available and in use.

There are protocols providing different trade-offs between communication bandwidth, latency, processing, and fault resiliency. Currently, most well-known BFT protocols concern cryptocurrency use-cases. By way of contrast, an embodiment of the invention comprises the application of BFT protocols to ZTAs, which may result in a very different scenario.

B.3.1 Inter-Component Trust Sharing

The first protocol to solve the BFT problem for asynchronous settings relied heavily on creating trust dependencies between committee members. See reference [5]. The seminal asynchronous protocol uses two message types: initial and echo. The echo message type is employed by non-faulty stakeholders to validate the initial message by comparing it with other stakeholders echoes, initial is deemed valid only if enough echoes match its value. Thus, the echo message is an example of inter-component trust distribution between committee members.

However, a protocol relying on echo messages introduces considerable overhead to achieve consensus. Thus, alternative approaches have been developed and the concept of relying on echo messages has fallen out of favor.

Notwithstanding the known shortcomings associated with the use of echo messages, an embodiment may employ echo messages since the interoperability aspect of ZTAs enable leveraging the use of echo messages without creating excessive overhead on the committee effort of achieving consensus in the network. Thus, an embodiment may use a separate communication channel with the SIEM which preserves the protocol performance intact while ensuring that BFT technology better accommodates ZT tenets and principles in its architectural design.

B.3.2 Practical BFT (pBFT)

Figure 2:
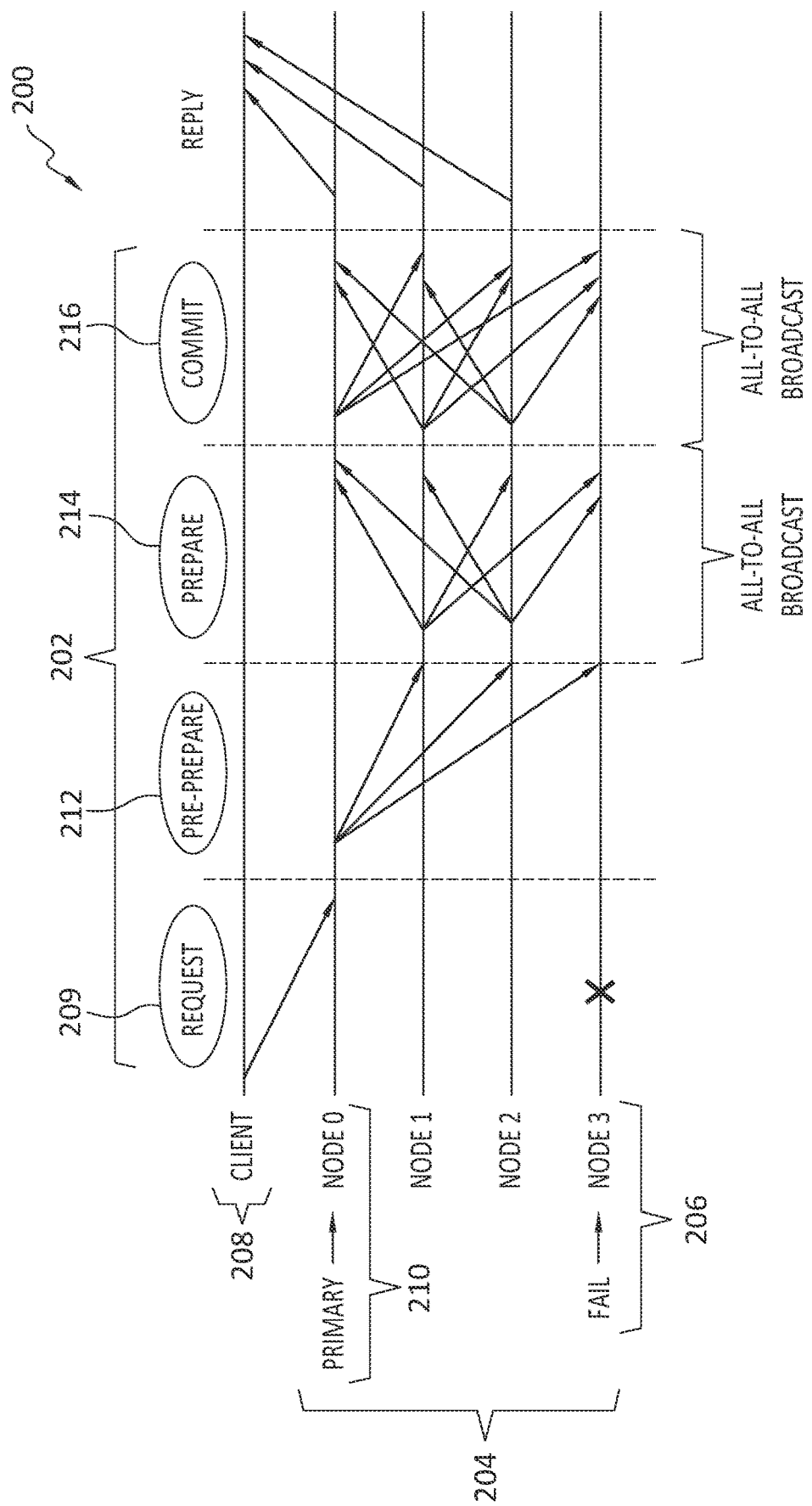
FIG. 2 discloses aspects of a pBFT communication protocol.

As shown in the example of FIG. 2, the pBFT communication protocol 200 may comprise five phases 202. In the example of FIG. 2, the pBFT communication protocol 200 is implemented with a system that includes four nodes 204, one of which is a faulty node 206.

In pBFT, a client 208 starts the protocol by requesting 209 a validation or some operation that require consensus for the system. A primary node 210 is responsible for receiving the client 208 request 209 and starting three phases called pre-prepare 212, prepare 214, and commit 216. The phases prepare 214 and commit 216 each require an all-to-all broadcast.

The pBFT algorithm proceeds as follows, with reference to the elements of FIG. 2:

(1) in the pre-prepare phase 212, the primary node 210 generates a new view and submits transactions associated with it in a message via broadcast;
(2) once a non-primary node accepts the pre-prepare message, it enters the prepare phase and then broadcasts a signed prepare message to all the nodes in the view;
(3) if a node 204 receives 2f different prepare messages which matches its accepted pre-prepare message, that node 204 can start the commit phase 216;
(4) in the commit phase 216, if a node 204 receives 2f+1 different commit messages matching its accepted pre-prepare and prepare messages, that node 204 commits the transactions and replies to the client; and
(5) The transactions are considered correct when the client 208 receives f+1 identical results or responses from different nodes 204 in the same view defined by the primary node 210.

C. OVERVIEW OF ASPECTS OF ONE EMBODIMENT

C.1 Introduction

In a worst case scenario, it may be necessary to ensure situational awareness of a problem, such as a subverted control plane, even when it is not possible to maintain the resilience of that component, that is, the control plane in this example. Awareness of such scenarios may provide a last resort of defensive measures in each perimeter through usage of various measures or manual intervention.

Thus, an embodiment may comprise a method that provides a way to harden access control and threat response by leveraging BFT technology and, thereby, provide considerable resiliency gains, even for small committee sizes, due to the benefits of byzantine situation awareness. An embodiment of a system uses the byzantine situation-awareness modification on top of any BFT protocol. Thus, the implementation and use of an embodiment may be non-disruptive and incremental to existing technology. Moreover, an embodiment may have the following advantages with respect to approaches that rely solely on analytics protection of the control plane:

an embodiment may directly observe the decision and enforcement process, thus focusing and prioritizing resources precisely on important attack vectors; and
while, in an embodiment, an adversary may be able to subvert the system decision by gaining control over enough BFT committee members, doing so without being noticed requires taking control of the full system, possibly at once—thus, an embodiment may greatly hinder the efforts of the adversary to move laterally through the network without being noticed—in fact, in an embodiment, to reach the most sensitive network regions, the attacker would, when an embodiment is employed, be required to either bypass all perimeters through its path or fully subvert the committees so that it can make progress unnoticed—this may be impractical, if not impossible, for the attacker.

Due to the latter property, the byzantine situation-aware access control implemented in an example embodiment may rely on less computational resources than traditional BFT protocols because the total committee size can be considerably smaller due to byzantine awareness. Thus, an embodiment may provide, among other things, efficient cyber-resiliency while requiring a smaller implementation footprint, relative to conventional approaches, because the embodiment may operate with an additional resiliency dimension, situation-awareness, whereas traditional BFT resiliency is focused on achieving consensus and does not consider or implement situational awareness.

C.2 Discussion

One example embodiment may assume a ZTA employing BFT protocols for PDP and PEP whenever financially justifiable, for example, in most critical network regions but potentially elsewhere depending on resource availability. In an embodiment, BFT is employed to harden a ZTA in consideration of the following observations:

1. Not all BFT protocols are resource intensive nor necessarily rely on blockchain approaches. ZTA access control can rely on BFT technology even when relying on a non-optimized protocol such as pBFT and yet benefit from normal case operation with negligible overhead (3% increase latency) with respect to not using BFT.
2. It is noted that compromised PEPs cannot bypass PDP decisions because they need to provide enough valid PDP signed messages to the resource for it to proceed and accept the transaction. One possible configuration may be inspired in software-defined perimeters, with standard network PEPs acting as inbound enforcement points and a resource proxy acting as an outbound enforcement point. In such case, the network flow would be: client→inbound PEPs→PDPs→outbound PEP→resource. An embodiment discussed elsewhere herein provides an example of this.
3. it is feasible to create an ecosystem leveraging on different vendors to achieve the BFT assumption of nearly independent faults. Although this limits BFT committees to a few independent faults (e.g. one or two independent faults), the approach we devise allows to obtain great resiliency gains even when the BFT fault resiliency is small. It is noted that an embodiment comprises an inclusive approach to create more resilient ZTA ecosystems by mixing multiple vendor technology not only to provide interoperability but also to provide component redundancy.
4. it is not required that every access control component in the network has a replica with a different software/hardware. The same set of heterogeneous software/hardware may be replicated in different segmentation points as long they are not dedicated to protecting the same region, for example to prevent lateral movement by an adversary through the network. Even when considering lateral movement prevention, an embodiment may provide considerable benefits in terms of situation-awareness which enables the computation of adaptive risk and performance of corresponding automated defensive measures.

One example embodiment builds on top of the ZTRA specifications to enhance a BFT protocol with echo messages to be provided to the SIEM. This approach enables the SIEM to identify potential discrepancies and operate in the following way:
  Any discrepancy in BFT committee transactions is treated as a potential subversion of these components.
  Such occurrences are communicated downstream services such as incident management or SOAR component orchestration.
  Faults resulting in delays or absence of replies are also informed to the SOAR as a request for remediation.
    The system may also opt to inform them to the SIEM for preventive or even proactive investigation. The alert criticality can depend on factors such as whether they are known potential faults or novel unexpected faults.

The situational awareness enabled in a BFT context, provided by the aforementioned enhancement of the BFT protocol, enables an additional defensive approach to the traditional SIEM analytics-based approach. Whenever byzantine situation-awareness is triggered, a system according to one embodiment may operate in the following way:
  Risk and tolerance scores employed in the dynamic policies are a function of the byzantine situation awareness itself. This can be applied both at the particular BFT committee generating alerts and/or according to some more complex logic. For example, a neighborhood of network perimeters can also be affected.
  Observability of decision process subversion can occur if at least a single member, such as a node, of the committee is still under the control of the network and is not being controlled by an adversary.
  Whenever a single committee member observes a byzantine fault, that committee member communicates with SIEM and SOAR—as noted earlier, this approach is a significant improvement in terms of defensive controls, since SIEM and SOAR may initiate actions, including defensive actions and remedial actions, when faulty alerts are observed.
  SIEM may evaluate whether the committee has been compromised through local re-evaluation of the decision process.
  Control postures may then be performed on faulty nodes, for example:
    SOAR may operate to mitigate malfunctioning or malicious committee members. In particular, SOAR may either attempt to repair flagged members or to initiate novel members followed by a shutdown of flagged members, if the underlying BFT protocol allows for it. Other strategies may also be considered.
    SIEM may perform root cause analysis whenever flagged by byzantine-awareness mechanism, therefore improving analytics efficiency by allocating resources on regions where the adversary is more likely to be present.

As disclosed herein then, an embodiment may comprise an approach for hardening access control and threat response, in a communication network for example, by leveraging BFT technology. Further, an embodiment may provide considerable resiliency gains even for small committee sizes due to the benefits of byzantine situational awareness. An embodiment of a system uses the byzantine situation-awareness modification on top of any BFT protocol. Thus, an embodiment may be implemented and used in a way that is non-disruptive and incremental to existing technology. An embodiment may possess one or more of the following advantages, at least as compared with approaches that rely solely on analytics protection of the control plane:
  an embodiment may directly observe the decision and enforcement process, therefore focusing and prioritizing resources precisely on important attack vectors; and
  while, in an embodiment, an adversary may be able to subvert the system decision by gaining control over enough BFT committee members, doing so without being noticed requires taking control of the full system, possibly at once—thus, an embodiment may greatly hinder the efforts of the adversary to move laterally through the network without being noticed—in fact, in an embodiment, to reach the most sensitive network regions, the attacker would, when an embodiment is employed, be required to either bypass all perimeters through its path or fully subvert the committees so that it can make progress unnoticed—this may be impractical, if not impossible, for the attacker.

C.3 Further Discussion

As disclosed herein, one or more embodiments may possess various useful features and aspects, although no embodiment is required to possess any of such features and aspects. The following examples are illustrative. In an embodiment, a decision making and enforcement process resiliency is achieved through byzantine situation-awareness instead of simply exploiting BFT technology as a tool for reaching consensus between committee members. In an embodiment, observability of the decision and enforcement process subversion is ensured if at least one committee member is still under the control of the network. In an embodiment, access control policies dynamically compute risk and tolerance scores as a function of attempts to subvert the decision and enforcement process. An embodiment may be BFT protocol agnostic, so as to enable ZTAs to benefit from byzantine situation-awareness regardless of any network specific requirements.

In contrast with one or more embodiments, current BFT technology for ZT systems focuses either on protocol improvements to aligning those protocols with the BFT technology requirements, or on providing architectural resiliency for ZT components. At present however, there is no known approach for using, as in the case of an example embodiment, the byzantine situation-awareness as a source of information for resiliency purposes, and defining defensive measures regarding access control.

D. DETAILED DISCUSSION OF ASPECTS OF AN EMBODIMENT

One embodiment is concerned with the problem of mitigating attack vectors to access control components. This may be achieved, in an embodiment, by leveraging ZT component interoperability to empower BFT technology and, using knowledge distributed across components to automate defensive postures, including both: replacing malfunctioning components; and adapting system tolerance to risk by applying dynamic policies based on situational awareness.

D.1 Introductory Notes

Following are some notes that pertain to an example embodiment. None of these notes should not be taken as applying to any particular embodiment, nor to all embodiments.

To improve resiliency, in one embodiment, other ZT control plane components such as SIEM/SOAR may also be enhanced with BFT protocols. It is noted that applying interoperability with intra-component trust sharing may be extended, in one embodiment, to the entire control plane, and/or other components of a communication network. Although extending interoperability to other components may be implemented, application of this concept throughout the full control plane may imply circular interoperability.

In an embodiment, each BFT protocol may be carefully evaluated to create flags of attack vectors beyond those provided in this invention. A non-exhaustive group of examples of this are disclosed herein. When particularities of the BFT protocol are considered, one example embodiment focuses on the pBFT protocol described herein.

Finally, ZTRA specifies some high-level concepts of the architecture, but these can vary considerably across different implementations. Therefore, inter-component trust sharing may occur in various ways, depending on each specific ZTA embodiment. Byzantine protocols must be adapted to allow byzantine situation-awareness considering inter-component trust sharing implementations. One example of this is discussed below.

D.2 Access Control Components and Operation Dynamics

Figure 3:
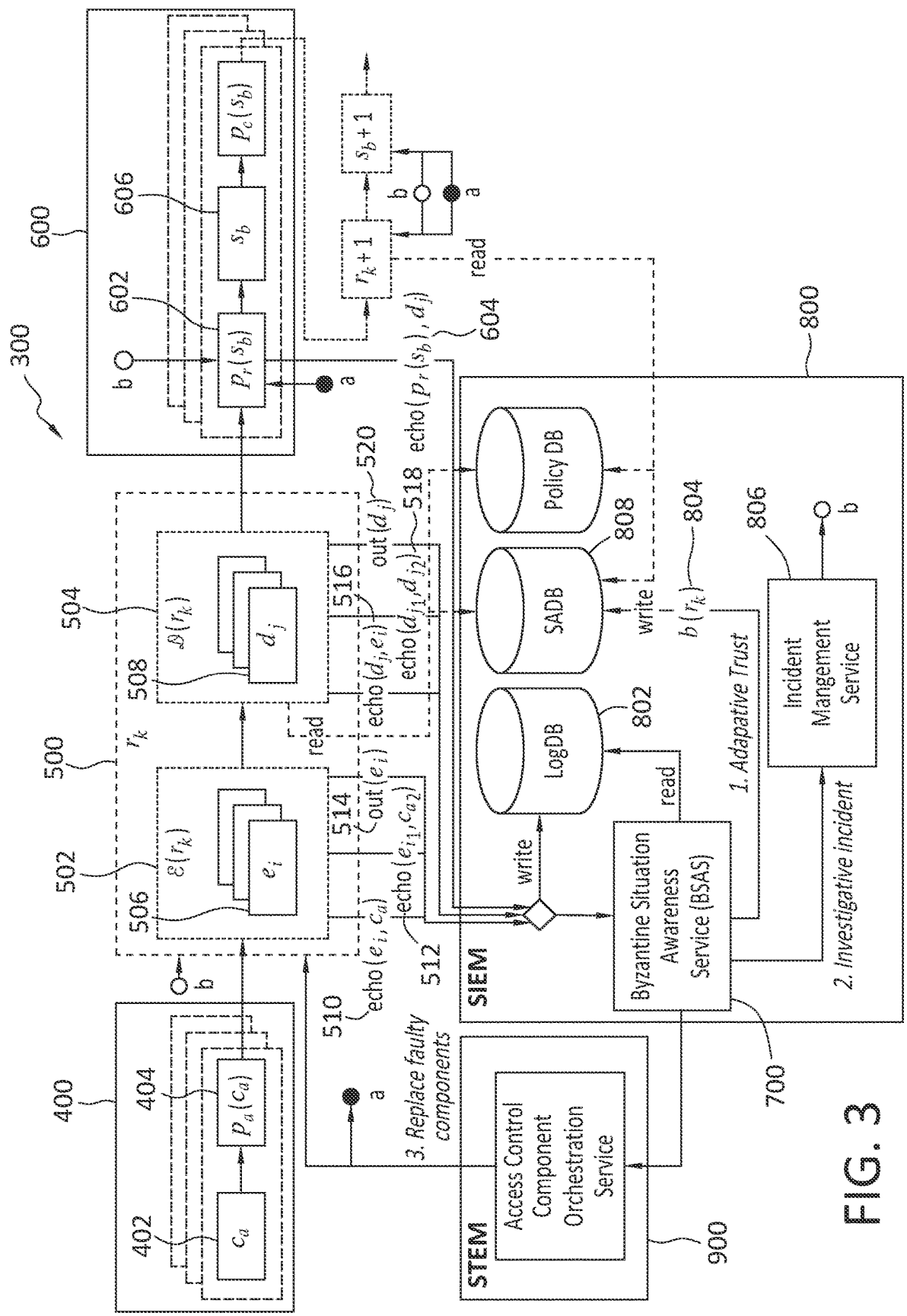
FIG. 3 discloses various elements of a ZTA, according to one embodiment.

With reference now to FIG. 3, an example of a ZTA embodiment 300 is disclosed that includes perimeter $r_k$ intercepting a client $c_a$ request to a resource $s_b$ by a PEP $\varepsilon(r_k)$ and PDP $\mathcal{D}(r_k)$ that is monitored by SIEM 800 and orchestrated by SOAR 900. To facilitate the present discussion, various different sections, or modules, of the ZTA embodiment 300 will be discussed in turn. Example embodiments of these modules are respectively denoted at 400, 500, 600, and 700. Note that this use of the term 'module' is not intended to limit the scope of this disclosure or the claims in any way. Following is an introduction to the notation used, and a description of the stages of operation of a system according to one example embodiment.

With more particular reference now to FIG. 3, client 402 $c_a \in \mathcal{C}$ denotes an entity performing a request to the ZTA, where $\mathcal{C}$ is the set of all clients. This client may or may not be handled by the ZTA. For every client 402 $c_a$, there may be a corresponding client proxy 404 denoted by $p_c(c_a)$. At least in one embodiment, the client proxy 404 $p_c(c_a)$ is not required, but may be employed in various embodiments such as Software Defined Perimeters (SDPs) to provide required functionalities to the client 402. In an embodiment, all components are defined accordingly to ZTA tenets and principles. In an embodiment, the communication, including a request 406, follows the indicated paths and any attempt to skip or directly connect to another component may be rejected by the network and seen as a potential threat.

The request 406 may be intercepted by a perimeter $r_k$, that is, the module 500, that is governed by a PEP, or initiating host in an SDP approach, and PDP, or SDP controller committee, denoted respectively by $\varepsilon(r_k)$ 502 (PEP) and $\mathcal{D}(r_k)$ 504 (PDP). Here, the following items are noted: the perimeter $r_k$ 500 may be omitted whenever the context is clear or irrelevant; the cardinality of the committee size is denoted by $n_\varepsilon$ and $n_\mathcal{D}$; $\varepsilon$ 502 and $\mathcal{D}$ 504 may be replicated in any other perimeter $r_l$ or in perimeter $r_k$ 500 for load balancing without requiring additional independent software/hardware configurations; resiliency improvements may occur even with small $n_\varepsilon$ and $n_\mathcal{D}$ sizes so that this approach is feasible even with an ecosystem that is composed of only a few hardware/software solutions, and the resiliency may improve as more players appear in the market—for example, $n_\varepsilon=4$ and $n_\mathcal{D}=4$ results in a valid configuration that enables a significant reduction in the chances that an adversary can progress in the network by compromising access control components; and, in such scenarios, typically $n_\varepsilon=n_\mathcal{D}$, and this particular case is considered in an embodiment described in this disclosure.

With continued reference to the example of FIG. 3, and particularly the example perimeter $r_k$ 500, example $\varepsilon$ 502 operations may be defined as follows:

$\varepsilon$ receives asynchronous messages from $p_c(c_a)$, $\forall c_a \in \mathcal{C}$ and determines their processing order using a BFT protocol. Considering the pBFT discussed earlier herein, this would typically imply use of the phases pre-prepare, prepare, and commit. However, instead of replying to the message client, each element 506, that is, $e_i \in \varepsilon$, forwards the message to a single corresponding element 508, that is, $d_i \in \mathcal{D}$. It is noted that, in an embodiment, it is not necessary to proceed this way, but in a scenario where the system is constrained to operating with a small number of heterogeneous software/hardware configurations, this approach enables enhancement of the system resiliency while also reducing communication bottlenecks and overall system latency by avoiding an all-to-all broadcast. This follows for an embodiment that employs mutually exclusive configurations for each $e_i$ 506 and $d_i$ 508 pair, and that $p_i$ only accepts communication from $e_i$ 506.

With continued reference to the example perimeter $r_k$ 500, example $\mathcal{D}$ 504 operations may be defined as follows:

For each request arising from $e_i$ 506 in $p_i$, a set of policies are evaluated to determine the final decision.

Each $d_j$ 508 ∈ $\mathcal{D}$ 504 always provide their decision to the resource reverse proxy $p_r(s_b)$ 602, even if the request from $e_i$ 506 in $p_i$ was denied. This enables differentiation of non-malicious failures from malicious ones by leveraging on system interoperability checks as described below.

Among other things, an embodiment comprises the ability to adapt risk tolerance based on situational awareness. While an example mechanism for this is described in more detail below, it is noted here that, in an embodiment, every policy is subject to situation awareness levels being available in situation awareness database (SADB) that impact their decisions. It is further noted that situation awareness levels of a perimeter $r_k$ 500 are not limited to impact only $\mathcal{D}(r_k)$ 504 and may affect $\mathcal{D}(r_l)$ for any $r_l$ as specified by the control plane policies. This approach enables coordination of defenses across perimeters, and the scaling of protection levels to neighboring regions, or any interdependent region, whenever a particular region is under attack.

In one embodiment, a compromised ε 502 cannot bypass D 504 decisions due to their interoperability, that is $p_r(s_b)$ 602 only performs an operation specified in the request 406 if it receives enough valid $\mathcal{D}$ 504 signatures. Thus, an embodiment performs a process of hardening the access control components from being subverted. Another challenge that may be handled by an embodiment is hardening against potential bypassing of the access control components by directly compromising $p_r(s_b)$ 602 or the resource, which is not specific to the devised architecture. In this regard, it is noted that a properly configured $p_r(s_b)$ 602 should be hidden in the network and only accept (1) proper messages from $\mathcal{D}$ 504 and (2) responses from the resource, as in SDP architectures. For this reason, the application, by one embodiment, of intra-dependency trust sharing to the reverse proxy has lower priority than application of intra-dependency trust sharing to the access control components ε 502 and $\mathcal{D}$ 504. However, it is noted that the byzantine awareness mechanism of an embodiment may be extended to the reverse proxies 404 if enough heterogeneous software/hardware configurations are available to further harden the underlying architecture.

With continued reference to the example module 600 disclosed in FIG. 3, the of resource $s_b$ reverse proxy is denoted by $p_r(s_b)$ 602:

Differently from typical BFT approaches, such as that described for pBFT, the BFT committee decisions are not returned to the client but to the resource reverse proxy accompanied of the client request.

The reverse proxy $p_r(s_b)$ 602 only forwards the request to the resource if the reverse proxy $p_r(s_b)$ 602 receives f+1 valid signed messages from $\mathcal{D}$ 504 with such decision. That is, in an embodiment, the reverse proxy $p_r(s_b)$ 602 acts as an outbound PEP or an accepting host in an SDP embodiment (SDP gateway), while ε 502 members are inbound PEPs in this example.

The reverse proxy $p_r(s_b)$ 602 may either open a data plane communication channel with the client proxy $p_c(c_a)$ 404, for example as specified by SDP, or return the transaction result to the client proxy $p_c(c_a)$ 404. This approach is not required in every embodiment but may be useful in cases where there is only a small number of heterogeneous software/hardware configurations.

If accepted by $p_r(s_b)$ 602, the transaction may result in further network activity that, likewise, may be intercepted when trespassing another perimeter $r_{k+1}$.

Such perimeters may, or may not, rely on BFT implementations for $\varepsilon(r_{k+1})$ and $\mathcal{D}(r_{k+1})$. BFT implementations may be used for any $\varepsilon(r_k)$ and $\mathcal{D}(r_k)$ as best employing available resources, therefore depending on the availability of heterogeneous software/hardware configurations and impact to user experience. There is no constraint that the entrance perimeter benefit of BFT architectures.

It is noted that regions $r_l$ not using BFT designs can still benefit of byzantine awareness dynamics to risk tolerance as included in one embodiment and described below, therefore allowing better network resiliency by making lateral movement more difficult even for these components.

As noted herein, one ZT principle relevant to an embodiment is that every transaction is logged. Redundancy is employed in an embodiment of the system to enable verification of the access control process by introducing echo messages. Instead of verifying transactions directly in the BFT committee as performed in the seminal asynchronous protocol which hinders performance, as described earlier herein, an embodiment may leverage ZTA interoperability properties to enable such process to take place independently of the BFT consensus.

Thus, and as shown in FIG. 3, ε 502 members may, in one embodiment, forward the following transactions to the SIEM 800, including view change requests in pBFT protocol:

echo($e_i$; $c_a$) 510 are messages received from $c_a$ 402 by $e_i$ 506 which may include the client request and pre-prepare messages of the pBFT protocol;

echo($e_i$; $e_{i_1}$) 512 contains transactions received from $e_{i_1}$ by $e_{i_2}$ which may include prepare and commit messages; and out($e_i$) 514 contains the processing order decided by $e_i$ provided to $\mathcal{D}$ 504.

Similarly, and with continued reference to the example of FIG. 3, $\mathcal{D}$ 504 members may provide the following to SIEM 800:

echo($d_j$; $e_i$) 516 are messages received from $d_j$ 508 by $e_i$ 506—note that as previously described, an embodiment may consider only echo($d_i$; $e_i$) 516;

echo($d_{j_1}$; $d_{j_2}$) 518 contains transactions received from $d_{j_2}$ by $d_{j_1}$—in an embodiment, such echoes only occur if $\mathcal{D}$ 504 members execute transactions between their members—in an embodiment, this is not required, but may be employed by the system if beneficial;

out($d_j$) 520 contains the processing order decided by $d_j$ 508 provided to $p_r(s_b)$ 602; and and $p_r(s_b)$ performs the final transactions echo($p_r(s_b)$, $d_j$) 604, which is the transaction received from $d_j$ 508 by $p_r(s_b)$ 602.

As further indicated in FIG. 3, SIEM 800 may, based on the aforementioned operations of the $\mathcal{D}$ 504 members, perform operations including:

stores the received transactions in the log database (Log DB) 802;

forwards incoming transactions to the Byzantine Situation Awareness Service (BSAS) 700 that scans them for inconsistencies as described below;

the scan results may:
- impact the byzantine awareness level of a region $r_k$ as denoted by $b(r_k)$ 804;
- trigger the investigation of the incident performing in-depth analysis of a component or request to expert intervention; and
- trigger the incident management service 806 to replace faulty components or to take other automated defensive postures such as increasing component threat protection levels.

Following are some example aspects of system interoperability and intra-component trust sharing, according to one embodiment:
- $\varepsilon$ 502 determines a fault tolerant transaction processing order in $\mathcal{D}$ 504.
- $\mathcal{D}$ 504 provides decisions to $p_r(s_b)$ 602.
- $p_r(s_b)$ 602 ensures that transactions are forwarded to sp 606 if $\mathcal{D}$ 504 achieved consensus on this decision, that is, $p_r(s_b)$ 602 is fault tolerant.
- Byzantine situation awareness service 700 compares echoed transactions from $\varepsilon$ 502, $\mathcal{D}$ 504, and $p_r(s_b)$ 602 as described below and:
  - impacts $\mathcal{D}$ 504 decision making process to be dynamically determined on the byzantine awareness level $b(r_k)$, also described below.
  - may trigger incident investigations on $\varepsilon$ 502, $\mathcal{D}$ 504, and $p_r(s_b)$ 602.
  - may perform replacement of faulty $\varepsilon$ 502, $\mathcal{D}$ 504, and $p_r(s_b)$ 602 components.

It is noted that, in one embodiment, a system cannot be protected if all $\varepsilon$ 502, $\mathcal{D}$ 504, and $p_r(s_b)$ 602 have been subverted as, those circumstances indicate that the network is now completely controlled by an adversary. Such a system is not able to raise or identify any operational inconsistency and the fact that the system is controlled by the adversary can only be detected through other mechanisms.

In the case of incident investigation, such as by the IMS 806, an embodiment may rely on existing technology performing root cause analysis, for example using provenance graphs. With respect to access control component orchestration, an embodiment may implement infrastructure as a service (IaaS) for non-malicious faults but may require more complex solutions for malicious cases since a malicious case may imply a requirement for a new infrastructure not subject to the threat that previous compromised a component. An embodiment provides a mechanism to enable such orchestration.

D.3 Byzantine Situation-Awareness Service (BSAS)

As noted earlier, an embodiment may comprise a BSAS, such as the BSAS 700 disclosed in the example of FIG. 3. In an embodiment, a role of the BSAS 700 is to determine the byzantine awareness level $b(r_k)$ for each perimeter $r_k$ 500. One embodiment may rely on the observation of inconsistencies in $r_k$ 500 access control components such as $\varepsilon(r_k)$ 502 (PEP) and $\mathcal{D}(r_k)$ 504 (PDP). Examples of such inconsistencies include, but are not limited to, the following:
- Non-critical faults: these are the result of potential communication losses or due to terminated nodes, but may as well be the result of malicious faults. The byzantine echoes may not be enough to ensure potentially malicious faults in some cases, but further investigation can be performed if the component is online.
- Malicious faults: these ensure that there are malicious agents operating in the system.
- Subverted control: in case BFT committee is in the possession of an adversary.

As noted earlier herein, logging all transactions is typically performed in a ZT environment. The following discussion addresses how, in an embodiment, to compare transactions received by the BSAS 700:

Let $\mathcal{M}_i = C(m_i)$ denote a function that retrieves all messages $\mathcal{M}_i$ that can be compared with $m_i$. For instance: if $$m_i = \text{echo}\big(p_{r_{(s_b)}}, d_j\big),$$

then $\mathcal{M}_i = \{\text{out}(d_j)\}$ and if $m_i = \text{echo}(e_i, e_j)$, then $\mathcal{M}_i = \{\text{echo}(e_i, e_j): j<n_e, j\neq i\}$.

Message mismatch indicates malicious faults due to manipulation of the content of one of the messages. Some potential cases include:
- Signature mismatch when there is an attempt to falsify signatures by another node.
- View mismatch when one node is operating in the wrong view. This may be an indication of a malicious primary.
- Sequence number out of bounds: this is a way malicious actors can attempt to break the BFT protocol.
- Value mismatch:
  - This is the seminal protocol approach to asynchronous BFT. If there is a mismatch between echoes, then there is a malicious actor attempting to mislead the system.
  - The comparison of $\text{echo}(p_r(s_b), d_j)$ and $\text{out}(d_j)$ which allows for hardening the system if $\mathcal{D}$ is in the control of a malicious agent except for a minority of members still under the network control.
- Message timeout:
  - In most cases, a message timeout indicates non-critical faults, but may be the result of subverted perimeters with a few isolated components still under the control of the network organization, as previously indicated herein.
  - For any incoming message, BSAS 700 also triggers a timeout evaluation callback that evaluates for missing echoes in $\mathcal{M}_i$ set.
  - If there are time-outs, those may tend to mostly trigger non-critical faults.
  - To ensure that the system is not subverted if the message involves an access control decision, BSAS 700 may request a SOAR orchestrator 900 to re-evaluate the decision in an isolated backup infrastructure. If there is a difference, then that difference triggers a subverted control fault.
- Reaching consensus time bounds:
  - Protocols are ensured to achieve consensus in limited bounds. Each protocol has its own performance guarantees that depends on the order of faulty members. Practical values can be determined in commissioning phases and deviations may indicate subverted control faults, that is, faults indicating that an adversary has subverted control of one or more nodes of the network.
- Protocol-specific evaluations by considering its specificities, for example:
  - Hierarchical or topological protocols can check for echoes that do not respect the topology constraints.

It is noted that the aforementioned verification, such as by message comparison, may comprise, in an embodiment, a simple comparative process that can be performed online without requiring considerable resources. It provides input for determining $b(r_k)$. A possible approach can rely on an accumulative scoring system based on the inconsistencies such as, for example:

$$b(r_k) = \max(n(t) + m + s, 1)$$

Non-critical faults n (t) may decay with time, allowing the system to eventually forget them and focus on more critical faults.
    A constant factor can be attributed to non-critical fault observations, or those observations can be weighted differently based on how typically they occur in the system.
    Likewise, the decay factor can be optimized to consider resource availability in SOAR to prioritize patching of non-critical faults.
    We note that frequent non-critical faults can facilitate a malicious agent to subvert system control by reducing the number of nodes in control of the organization.
Malicious fault score m and subverted system fault score s do not decay with time. This is to indicate that the system performs the defensive measures until the SOAR 900 normalizes the situation.
    Subverted system fault observations imply in maximum byzantine awareness level, in above embodiment $b(r_k)=1$.
    The m score may be a function of the number of faulty nodes in $r_k$. For example, one embodiment provides that $m=(mf+1)/(f+1)$, where f is the BFT fault tolerance and mf is the observed malicious faults. Note that when $mf=f$, that is indicative of a case where the BFT access control mechanism has been subverted by an adversary.
    For any modification in $b(r_k)$, SIEM 800 updates an SADB 808 with the new value which immediately enables access control in the ZTA as described in more detail below, thus providing dynamic access policies as a function of byzantine situation-awareness. As noted herein, fault observations may be employed to trigger investigations and SOAR 900 actions in the access control components.

D.4 Adaptative Trust Via Byzantine Situation-Awareness

To reflect stablished practices on risk-based access decisions, the policy decision making, in one embodiment, is performed by comparing two competing scores, namely, risk r versus its tolerance T. Then, a PDP member $d_i \in \mathcal{D}$ 504 takes the decision $o_i = r_i < T_i$. In the non-limiting case where byzantine situation-awareness levels impacts only its tolerance $T_i$, this can be performed as follows:
    Let $\mathcal{R}_k$ determine a set of sensitive perimeters to region $r_k$ 500.
    Let $b_i \in \mathcal{B}_k$ denote the $b(r_i)$ for any $r_i \in \mathcal{R}_k$.
    Then, one possible embodiment to make $d_i$ 508 decision dynamic in byzantine situation-awareness is $o_i = r_i < \max(T_i - \max(\mathcal{B}_k), T_{min})$, where $T_{min}$ denotes a minimum risk tolerance level threshold.

E. EXAMPLE METHODS

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 4:
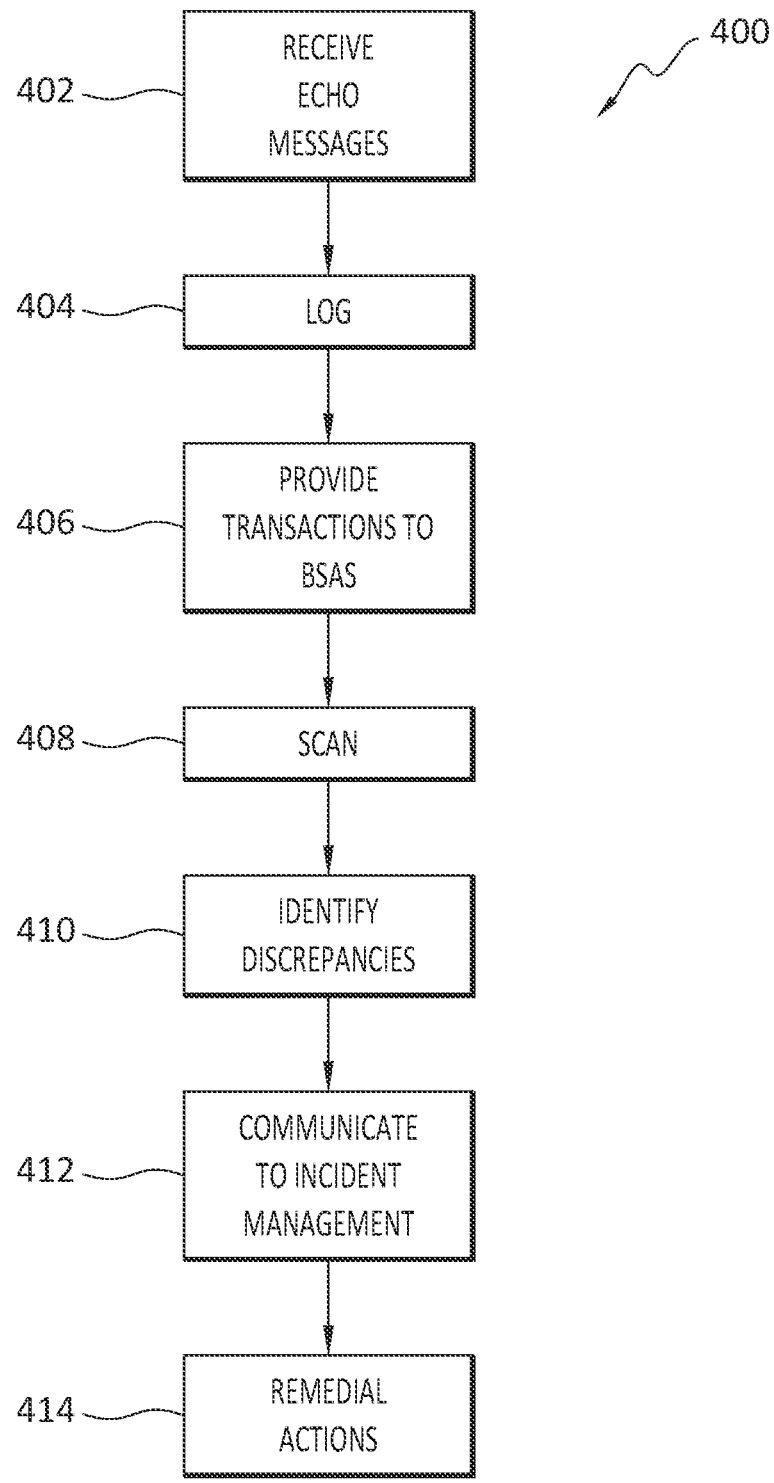
FIG. 4 discloses aspects of an example method, according to one embodiment.

Directing attention now to FIG. 4, a method according to one example embodiment is referenced at 400. In an embodiment, the method 400 may be performed in whole or in part by a Security Information and Event Management (SIEM) system that is able to communicate with, for example, policy decision points, policy enforcement points, and a Security Orchestration and Automation Response (SOAR) system. The method 400 may be implemented in a ZT architecture that operates in accordance with a BFT protocol.

The method 400 may begin when an SIEM system receives 402 echo messages from one or more policy decision points, and from one or more policy enforcement points. By receiving these messages 402, the SIEM, in effect, observes a decision and enforcement process that is being carried out by the policy decision points, and the policy enforcement points.

After the echo messages have been received 402, the messages may be logged 404 in a database. Next, or at the same time as the messages are logged 404, the messages, which may be considered as indicating transactions involving the policy decision points and the policy enforcement points, may be provided 406 to a BSAS (Byzantine situation awareness service).

The BSAS may then scan 408 the messages, and identify 410 any discrepancies indicated in the messages. The discrepancies may be communicated 412 by the BSAS to an incident management system. The incident management system may maintain, or access, a map of discrepancies to various remedial actions. Based on the discrepancies identified 410, and the mapped remedial actions, one or more of the remedial actions may then be implemented 414.

F. FURTHER EXAMPLE EMBODIMENTS

Following are some further example embodiments. These are presented only by way of example and are not intended to limit the scope of this disclosure or the claims in any way.
    Embodiment 1. A method, comprising: receiving, from a component operating in a network and participating in byzantine decision-making processes, one or more echo messages, and the echo messages originate either from communications sent by the component to one or more other components participating in the byzantine decision-making processes, or from communications received by the component from the one or more other components participating in the byzantine decision-making processes; logging the echo messages in a database; forwarding the echo messages to a byzantine situation awareness service (BSAS); scanning, by the BSAS, the echo messages; identifying, by the BSAS, a discrepancy in the echo messages; communicating, by the BSAS, the discrepancy to an incident management system; and implementing, or directing implementation of, by the incident management system, a remedial action that corresponds to the discrepancy.

Embodiment 2. The method as recited in any preceding embodiment, wherein a decision policy associated with one of the byzantine decision-making processes specifies a risk score and a tolerance score.

Embodiment 3. The method as recited in any preceding embodiment, wherein the network comprises a zero trust (ZT) environment that employs a byzantine fault tolerance (BFT) protocol.

Embodiment 4. The method as recited in any preceding embodiment, wherein one of the echo messages indicates that a single committee member in the network has observed a byzantine fault.

Embodiment 5. The method as recited in any preceding embodiment, wherein the one or more echo messages define an observation of a decision and enforcement process that is performed by a policy enforcement point and a policy decision point.

Embodiment 6. The method as recited in embodiment 5, wherein the observation is performed so long as at least one committee member in the network is under control of the network.

Embodiment 7. The method as recited in any preceding embodiment, wherein a policy associated with a policy enforcement point specifies a condition under which access will be granted to a resource of the network.

Embodiment 8. The method as recited in any preceding embodiment, wherein an access control policy associated with a policy enforcement point dynamically determines risk and tolerance scores as a function of attempts by an adversary to compromise a decision and enforcement process performed by the policy enforcement point and a policy decision point.

Embodiment 9. The method as recited in any preceding embodiment, wherein the echo messages relate to a request, received from a client, for access to a network resource.

Embodiment 10. The method as recited in any preceding embodiment, wherein byzantine situation-awareness obtained by the scanning and the identifying is performed on top of a BT protocol, and the byzantine situation-awareness is agnostic as to the BT protocol.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 5:
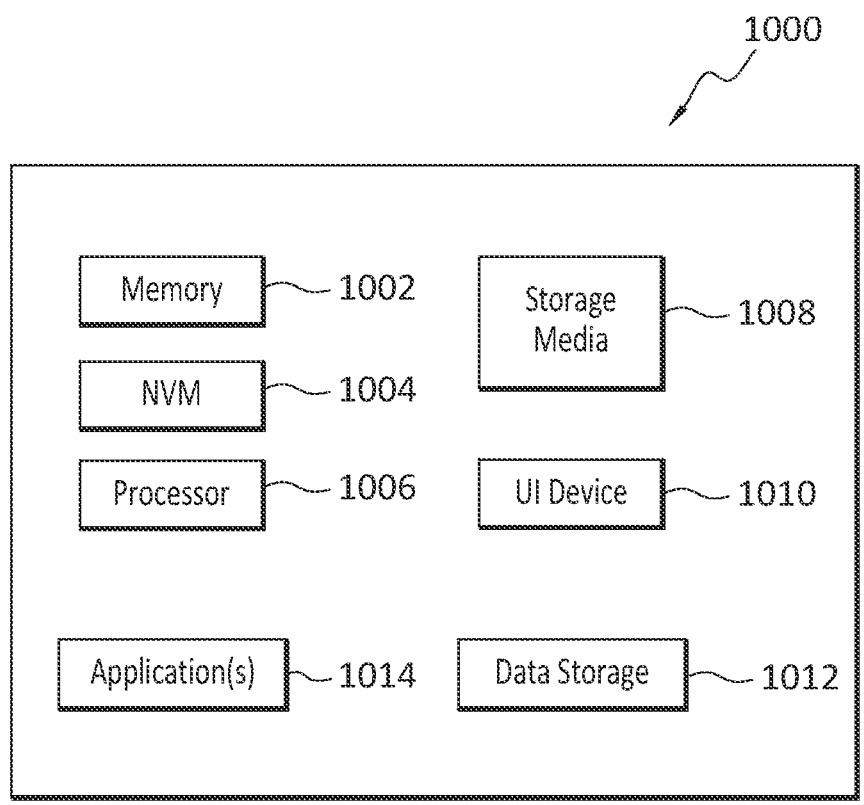
FIG. 5 discloses aspects of an example computing entity that is configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 5.

In the example of FIG. 5, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method, comprising:
  receiving, from a component operating in a network and participating in byzantine decision-making processes, one or more echo messages, and the echo messages originate either from communications sent by the component to one or more other components participating in the byzantine decision-making processes, or from communications received by the component from the one or more other components participating in the byzantine decision-making processes, wherein the one or more echo messages define an observation of a decision and enforcement process that is performed by a policy enforcement point and a policy decision point, and the observation is performed so long as at least one committee member in the network is under control of the network;
  logging the echo messages in a database;
  forwarding the echo messages to a byzantine situation awareness service (BSAS);
  scanning, by the BSAS, the echo messages;
  identifying, by the BSAS, a discrepancy in the echo messages;
  communicating, by the BSAS, the discrepancy to an incident management system; and
  implementing, or directing implementation of, by the incident management system, a remedial action that corresponds to the discrepancy.

2. The method as recited in claim 1, wherein a decision policy associated with one of the byzantine decision-making processes specifies a risk score and a tolerance score.

3. The method as recited in claim 1, wherein the network comprises a zero trust (ZT) environment that employs a byzantine fault tolerance (BFT) protocol.

4. The method as recited in claim 1, wherein one of the echo messages indicates that a single committee member in the network has observed a byzantine fault.

5. The method as recited in claim 1, wherein a policy associated with a policy enforcement point specifies a condition under which access will be granted to a resource of the network.

6. The method as recited in claim 1, wherein an access control policy associated with a policy enforcement point dynamically determines risk and tolerance scores as a function of attempts by an adversary to compromise a decision and enforcement process performed by the policy enforcement point and a policy decision point.

7. The method as recited in claim 1, wherein the echo messages relate to a request, received from a client, for access to a network resource.

8. The method as recited in claim 1, wherein byzantine situation-awareness obtained by the scanning and the identifying is performed on top of a BT protocol, and the byzantine situation-awareness is agnostic as to the BT protocol.

9. A non-transitory storage medium having stored therein instructions that are executable by one or more hardware processors to perform operations comprising:
  receiving, from a component operating in a network and participating in byzantine decision-making processes, one or more echo messages, and the echo messages originate either from communications sent by the component to one or more other components participating in the byzantine decision-making processes, or from communications received by the component from the one or more other components participating in the byzantine decision-making processes, wherein the one or more echo messages define an observation of a decision and enforcement process that is performed by a policy enforcement point and a policy decision point, and the observation is performed so long as at least one committee member in the network is under control of the network;
  logging the echo messages in a database;
  forwarding the echo messages to a byzantine situation awareness service (BSAS);
  scanning, by the BSAS, the echo messages;
  identifying, by the BSAS, a discrepancy in the echo messages;
  communicating, by the BSAS, the discrepancy to an incident management system; and
  implementing, or directing implementation of, by the incident management system, a remedial action that corresponds to the discrepancy.

10. The non-transitory storage medium as recited in claim 9, wherein a decision policy associated with one of the byzantine decision-making processes specifies a risk score and a tolerance score.

11. The non-transitory storage medium as recited in claim 9, wherein the network comprises a zero trust (ZT) environment that employs a byzantine fault tolerance (BFT) protocol.

12. The non-transitory storage medium as recited in claim 9, wherein one of the echo messages indicates that a single committee member in the network has observed a byzantine fault.

13. The non-transitory storage medium as recited in claim 9, wherein a policy associated with a policy enforcement point specifies a condition under which access will be granted to a resource of the network.

14. The non-transitory storage medium as recited in claim 9, wherein an access control policy associated with a policy enforcement point dynamically determines risk and tolerance scores as a function of attempts by an adversary to compromise a decision and enforcement process performed by the policy enforcement point and a policy decision point.

15. The non-transitory storage medium as recited in claim 9, wherein the echo messages relate to a request, received from a client, for access to a network resource.

16. The non-transitory storage medium as recited in claim 9, wherein byzantine situation-awareness obtained by the scanning and the identifying is performed on top of a BT protocol, and the byzantine situation-awareness is agnostic as to the BT protocol.

* * * * *